(12) United States Patent
Nakamura et al.

(10) Patent No.: US 10,757,726 B2
(45) Date of Patent: Aug. 25, 2020

(54) TERMINAL DEVICE, BASE STATION DEVICE, AND COMMUNICATION METHOD USING CHANNEL QUALITY INDICATOR (CQI) TABLES AND MODULATION CODING SCHEME (MCS) TABLES TO DETERMINE MODULATION SCHEME

(71) Applicant: Sharp Kabushiki Kaisha, Osaka-shi, Osaka (JP)

(72) Inventors: Osamu Nakamura, Osaka (JP); Jungo Goto, Osaka (JP); Daiichiro Nakashima, Osaka (JP); Yasuhiro Hamaguchi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 469 days.

(21) Appl. No.: 15/107,510

(22) PCT Filed: Dec. 26, 2014

(86) PCT No.: PCT/JP2014/084688
§ 371 (c)(1),
(2) Date: Jun. 23, 2016

(87) PCT Pub. No.: WO2015/099172
PCT Pub. Date: Jul. 2, 2015

(65) Prior Publication Data
US 2016/0323912 A1    Nov. 3, 2016

(30) Foreign Application Priority Data

Dec. 27, 2013   (JP) ................................. 2013-270703

(51) Int. Cl.
*H04B 7/06* (2006.01)
*H04L 1/00* (2006.01)
(Continued)

(52) U.S. Cl.
CPC ...... *H04W 72/1289* (2013.01); *H04B 7/0626* (2013.01); *H04L 1/0003* (2013.01);
(Continued)

(58) Field of Classification Search
CPC ... H04B 7/0626; H04L 1/0003; H04L 1/0016; H04L 1/0026; H04L 1/0028;
(Continued)

(56) References Cited

U.S. PATENT DOCUMENTS 9,001,845 B2   4/2015 Enescu et al.
9,479,287 B2   10/2016 Yang et al.
(Continued)

FOREIGN PATENT DOCUMENTS

WO   2013/127303 A1   9/2013

OTHER PUBLICATIONS

Hitachi Ltd., "Views of Higher Order Modulation in Rel. 12", 3GPP TSG-RAN WG1 #75, R1-135873, Nov. 11-15, 2013, 5 pages.
(Continued)

*Primary Examiner* — Melvin C Marcelo
*Assistant Examiner* — Natali Pascual Peguero
(74) *Attorney, Agent, or Firm* — Keating & Bennett, LLP

(57) ABSTRACT

Selection of a suitable MCS improves throughput without increasing the number of pieces of control information. With RRC signaling, information on PDCCH and a CQI table that is referred to are associated with each other, and the CQI table that is referred to is determined based on information relating to the PDCCH. Thus, the CQI table that is referred to is selected at high speed. Furthermore, information relating to control information is control information that is included in the PDCCH or an ePDCCH. Furthermore, the information relating to the control information is a type of search space of the PDCCH or the ePDCCH.

4 Claims, 13 Drawing Sheets

(51) Int. Cl.
*H04L 27/36* (2006.01)
*H04W 72/12* (2009.01)
*H04L 5/00* (2006.01)
*H04W 28/06* (2009.01)
*H04W 72/00* (2009.01)

(52) U.S. Cl.
CPC .......... *H04L 1/0016* (2013.01); *H04L 1/0026* (2013.01); *H04L 1/0028* (2013.01); *H04L 5/0053* (2013.01); *H04L 27/362* (2013.01); *H04W 72/1284* (2013.01); *H04W 28/06* (2013.01); *H04W 72/00* (2013.01)

(58) Field of Classification Search
CPC ............... H04L 27/362; H04L 5/0053; H04W 72/1284; H04W 72/1289; H04W 28/06; H04W 72/00
USPC .......................................................... 370/329
See application file for complete search history.

(56) References Cited

U.S. PATENT DOCUMENTS

| | | | |
|---|---|---|---|
| 2013/0223255 A1 | 8/2013 | Enescu et al. | |
| 2015/0016553 A1 | 1/2015 | Yang et al. | |
| 2016/0013918 A1* | 1/2016 | Zhang | H04L 1/0016 370/329 |
| 2016/0094310 A1* | 3/2016 | Xia | H04L 1/0003 370/329 |
| 2016/0337073 A1* | 11/2016 | Kim | H04L 5/0057 |

OTHER PUBLICATIONS

"3rd Generation Partnership Project; Technical Specification Group Radio Access Network; Evolved Universal Terrestrial Radio Access (E-UTRA); Multiplexing and channel coding (Release 11)," 3GPP TS 36.212 V11.3.0, Jun. 2013, pp. 1-84.

"3rd Generation Partnership Project; Technical Specification Group Radio Access Network; Evolved Universal Terrestrial Radio Access (E-UTRA); Physical layer procedures (Release 11)," 3GPP TS 36.213 V11.3.0, Jun. 2013, pp. 1-176.

Catt, "Analysis on specification impact of higher order modulation", 3GPP TSG RAN WG1 Meeting #75, R1-135079, Nov. 11-15, 2013, 2 pages.

Panasonic, "Specification impact of introducing 256QAM", 3GPP TSG-RAN WG1 Meeting #75, R1-135395, Nov. 11-15, 2013, pp. 1-4.

Panasonic, "MCS Table Adaptation for Low Power ABS", 3GPP TSG-RAN WG1 Meeting 70bis, R1-124232, Oct. 8-12, 2012, pp. 1-7.

Samsung, "Discussion on specification impacts of 256QAM", 3GPP TSG RAN WG1 Meeting #75, R1-135208, Nov. 11-15, 2013, pp. 1-3.

Nakamura et al., "Terminal Device and Base Station Device," U.S. Appl. No. 15/107,516, filed Jun. 23, 2016.

Ericsson; "On Standard Impacts to Support 256QAM in Downlink"; 3GPP TSG RAN WG1; Meeting #75; R1-135655; Nov. 11-15, 2013; 3 pages.

Huawei, et al.; "Standard Impacts of 256QAM"; 3GPP TSG RAN WG1; Meeting #75: R-135033; Nov. 11-15, 2018; 4 pages.

Huawei, et al.; "Standard Impacts of 2560AM"; 3GPP TSG RAN WG1; Meeting #75: R1-135033; Nov. 11-15, 2013; 4 pages.

* cited by examiner

FIG. 3

| CQI INDEX | MODULATION SCHEME | CODING RATE | FREQUENCY EFFICIENCY |
|---|---|---|---|
| 0 | OUT OF RANGE | | |
| 1 | QPSK | 0.0762 | 0.1523 |
| 2 | QPSK | 0.1172 | 0.2344 |
| 3 | QPSK | 0.1885 | 0.3770 |
| 4 | QPSK | 0.3001 | 0.6016 |
| 5 | QPSK | 0.4385 | 0.8770 |
| 6 | QPSK | 0.5879 | 1.1758 |
| 7 | 16QAM | 0.3691 | 1.4766 |
| 8 | 16QAM | 0.4785 | 1.9141 |
| 9 | 16QAM | 0.6016 | 2.4063 |
| 10 | 64QAM | 0.4551 | 2.7305 |
| 11 | 64QAM | 0.5537 | 3.3223 |
| 12 | 64QAM | 0.6503 | 3.9023 |
| 13 | 64QAM | 0.7539 | 4.5234 |
| 14 | 64QAM | 0.8525 | 5.1152 |
| 15 | 64QAM | 0.9258 | 5.5547 |

FIG. 4

| CQI INDEX | MODULATION SCHEME | CODING RATE | FREQUENCY EFFICIENCY |
|---|---|---|---|
| 0 | OUT OF RANGE | | |
| 1 | QPSK | 0.0762 | 0.1523 |
| 2 | QPSK | 0.1885 | 0.3770 |
| 3 | QPSK | 0.4385 | 0.8770 |
| 4 | 16QAM | 0.3691 | 1.4766 |
| 5 | 16QAM | 0.4785 | 1.9141 |
| 6 | 16QAM | 0.6016 | 2.4063 |
| 7 | 64QAM | 0.4551 | 2.7305 |
| 8 | 64QAM | 0.5537 | 3.3223 |
| 9 | 64QAM | 0.6503 | 3.9023 |
| 10 | 256QAM | 0.4883 | 4.2969 |
| 11 | 256QAM | 0.5859 | 4.6875 |
| 12 | 256QAM | 06836 | 5.4688 |
| 13 | 256QAM | 0.7813 | 6.2500 |
| 14 | 256QAM | 0.8789 | 7.0312 |
| 15 | 256QAM | 0.9766 | 7.8125 |

FIG. 5

| MCS INDEX | MODULATION SCHEME | TBS INDEX |
|---|---|---|
| 0 | QPSK | 0 |
| 1 | QPSK | 1 |
| ⋮ | ⋮ | ⋮ |
| 8 | QPSK | 8 |
| 9 | QPSK | 9 |
| 10 | 16QAM | 9 |
| 11 | 16QAM | 10 |
| ⋮ | ⋮ | ⋮ |
| 15 | 16QAM | 14 |
| 16 | 16QAM | 15 |
| 17 | 64QAM | 15 |
| 18 | 64QAM | 16 |
| ⋮ | ⋮ | ⋮ |
| 28 | 64QAM | 26 |
| 29 | QPSK | reserved |
| 30 | 16QAM | |
| 31 | 64QAM | |

FIG. 6

| MCS INDEX | MODULATION SCHEME | TBS INDEX |
|---|---|---|
| 0 | QPSK | 0 |
| ⋮ | ⋮ | ⋮ |
| 5 | QPSK | 5 |
| 6 | 16QAM | 5 |
| ⋮ | ⋮ | ⋮ |
| 11 | 16QAM | 10 |
| 12 | 64QAM | 10 |
| 13 | 64QAM | 11 |
| ⋮ | ⋮ | ⋮ |
| 16 | 64QAM | 14 |
| 17 | 256QAM | 14 |
| 18 | 256QAM | 15 |
| ⋮ | ⋮ | ⋮ |
| 28 | 256QAM | 25 |
| 29 | QPSK | reserved |
| 30 | 16QAM | |
| 31 | 64QAM | |

FIG. 8

| VALUE OF CSI REQUEST FIELD | DESCRIPTION |
|---|---|
| '00' | APERIODIC CSI DOES NOT OPERATE |
| '01' | APERIODIC CSI IS CAUSED TO OPERATE IN SERVICING CELL c |
| '10' | APERIODIC CSI IS CAUSED TO OPERATE IN CELL IN FIRST SET THAT IS CONFIGURED FROM HIGHER LAYER |
| '11' | APERIODIC CSI IS CAUSED TO OPERATE IN CELL IN SECOND SET THAT IS CONFIGURED FROM HIGHER LAYER |

FIG. 9

| VALUE OF CSI REQUEST FIELD | CELL SET AND MODULATION MODE | | | |
|---|---|---|---|---|
| '10' | CC# | 1 | – | 3 |
|  | MODULATION MODE | 64QAM | – | 256QAM |
| '11' | CC# | – | 2 | 3 |
|  | MODULATION MODE | – | 64QAM | 64QAM |

FIG. 10

| VALUE OF CSI REQUEST FIELD | CELL SET AND MODULATION MODE | | | |
|---|---|---|---|---|
| '10' | CC# | 1 | – | 3 |
| | MODULATION MODE | 64QAM | – | 256QAM |
| '11' | CC# | – | 2 | 3 |
| | MODULATION MODE | – | 64QAM | 256QAM |

FIG. 13

| PDCCH | MODULATION MODE |
|---|---|
| USS | OPERATION AS 256 QAM |
| CSS | OPERATION AS 64 QAM |

FIG. 14

| CQI INDEX | MODULATION SCHEME | CODING RATE | FREQUENCY EFFICIENCY |
|---|---|---|---|
| 0 | OUT OF RANGE | | |
| 1 | QPSK | 0.0762 | 0.1523 |
| 2 | 256QAM | 0.4883 | 4.2969 |
| 3 | QPSK | 0.1885 | 0.3770 |
| 4 | 256QAM | 0.5859 | 4.6875 |
| 5 | QPSK | 0.4385 | 0.8770 |
| 6 | 256QAM | 06836 | 5.4688 |
| 7 | 16QAM | 0.3691 | 1.4766 |
| 8 | 16QAM | 0.4785 | 1.9141 |
| 9 | 16QAM | 0.6016 | 2.4063 |
| 10 | 64QAM | 0.4551 | 2.7305 |
| 11 | 64QAM | 0.5537 | 3.3223 |
| 12 | 64QAM | 0.6503 | 3.9023 |
| 13 | 256QAM | 0.7813 | 6.2500 |
| 14 | 256QAM | 0.8789 | 7.0312 |
| 15 | 256QAM | 0.9766 | 7.8125 |

TERMINAL DEVICE, BASE STATION DEVICE, AND COMMUNICATION METHOD USING CHANNEL QUALITY INDICATOR (CQI) TABLES AND MODULATION CODING SCHEME (MCS) TABLES TO DETERMINE MODULATION SCHEME

TECHNICAL FIELD

The present invention relates to a terminal apparatus and a base station apparatus.

BACKGROUND ART

With the recent popularization of smart phones or the like, there is an increasing demand for high-speed wireless transfer. In the Third Generation Partnership Project (3GPP) that is one among standardization organizations, standardization for Long Term Evolution (LTE) has been performed. Currently, Release 11 (Rel-11) standardization has almost been finished, and Rel-12 standardization has been performed.

For downlink in LTE, as modulation schemes, Quadrature Phase Shift Keying (QPSK), Quadrature Amplitude Modulation (16 QAM), and 64 QAM are supported. While only two bits can be transmitted on one modulation symbol with QPSK, 4 bits can be transmitted with 16 QAM and 6 bits can be transmitted with 64 QAM. More precisely, 16 QAM has higher frequency efficiency than QPSK, and 64 QAM has higher frequency efficiency than 16 QAM. However, when a channel state is poor for a base station apparatus (an evolved Node B(eNB)) and a terminal apparatus (User Equipment (UE)), the greater the number of transmission bits on one modulation symbol, the more likely a bit error is to occur. Accordingly, in LTE, a technology is employed in which a modulation scheme is adaptively selected depending on a channel state between the eNB and the UE and which is referred to as an adaptive modulation. Moreover, in addition to the modulation scheme, a coding rate of an error correction code is also adaptively changed in LTE. For example, in LTE Frequency Division Duplex (FDD), the UE estimates a downlink channel state based on a reference signal that is transmitted by the base station apparatus, and notifies the eNB of Channel Quality Information (CQI) that is obtained. The eNB selects a modulation scheme that has the highest frequency efficiency from among combinations of the modulation schemes and the coding rates (Modulation and Coding schemes (MCSs)) that have a prescribed error rate or less, using the notified CQI, and performs downlink transfer using the selected MCS. In this LTE, adaptive selection of the MCS depending on the channel state can realize high throughput.

Furthermore, in the Rel-12 standards, it is considered that in addition to the eNB in the related art, a pico base station (is referred to as a small cell) is arranged within a cell that is covered by the eNB. Moreover, the pico base station does not necessarily need to be equipped with a function as the base station, and may be configured as a forward-extending antenna (Remote Radio Head (RRH)). Because it is presupposed that multiple pico base stations are arranged within a cell and that sectoring is not performed, it is assumed that because interference between sectors does not occur and the like or for other reasons, a likelihood that a high Signal to Interference plus Noise power Ratio (SINR) will be obtained is higher since Rel-8. Accordingly, in 3GPP, the introduction of 256 QAM that enables 8-bit transmission on one symbol has been considered in addition to the introduction of QPSK, 16 QAM, and 64 QAM. With the introduction of 256 QAM, the UE that can receive data at a high SINR can further increase the throughput.

Incidentally, a value in a case where modulation schemes up to and including 64 QAM are assumed is defined for the CQI that the UE notifies the eNB (or the pico base station) of. For this reason, although the UE notifies the eNB of the greatest CQI, the eNB determines that the channel state is poor for transmitting data to the UE with 256 QAM, and regardless of an environment in which even though the transmission with 256 QAM is performed, the transfer can be performed without any error, the eNB is expected to transfer data using 64 QAM for the downlink. Furthermore, a channel that is referred to as a Physical Downlink Shared CHannel (PDSCH) is used for the data transfer for the downlink, but the MCS that is used on the PDSCH is notified using a channel that is referred to as a Physical Downlink Control CHannel (PDCCH), for transmission of control information. Nevertheless, because 256 QAM is not defined in the standards up to and including the Rel-11 standards, 256 QAM is difficult to configure on the PDCCH.

In this manner, with the CQIs and MCSs up to and including those in the Rel-11, it is difficult for the UE to make a request to the eNB for 256 QAM or it is difficult for the eNB to notify the UE that transfer with 256 QAM is performed. Accordingly, as disclosed in NPL 1 and NPL 2, in the standards up to and including the Rel-11 standards, the CQI and the MCS are defined with 4 bits and 5 bits, respectively, but because 256 QAM is supported, it is considered that an amount of information is increased by one bit for each of the CQI and the MCS, and thus, the CQI and the MCS are defined with 5 bits and 6 bits, respectively. Nevertheless, when the number of bits is increased, problems occur not only in that an increase in the control information decreases downlink throughput, but also in that an increase in the number of bits of the control information brings about the need to change a mechanism that is referred to as blind decoding that is performed on the control information.

Accordingly, in current 3GPP, as disclosed in NPL 3, it is proposed that a mode (hereinafter, referred to as a 64 QAM mode) in the related art in which a CQI index that is calculated with a CQI table which corresponds to modulation schemes up to and including 64 QAM is notified, and an MCS index is notified with an MCS table that corresponds to modulation schemes up to and including 64 QAM, and a new mode (hereinafter, referred to as a 256 QAM mode) in which a CQI index that is calculated with a CQI table which corresponds to modulation schemes up to and including 256 QAM is notified, and an MCS index is notified with an MCS table that corresponds to modulation schemes up to and including 256 QAM are prepared. Furthermore, in NPL 4, it is proposed that which table is selected is determined by a notification of a higher layer that is referred to as Radio Resource Control (RRC). With switching between the modes with the RRC, the transfer with 256 QAM can be supported without changing the number of bits of the CQI and the number of bits of the MCS.

CITATION LIST

Non Patent Literature

NPL 1: 3GPP TS36.212 V11.3.0
NPL 2: 3GPP TS36.213 V11.3.0

NPL 3: CATT, "Analysis on specification impact of higher order modulation," R1-135079, San Francisco, USA, Nov. 11-15, 2013

NPL 4: Panasonic, "Specification Impact of Introducing 256QAM," R1-135395, San Francisco, USA, Nov. 11-15, 2013

SUMMARY OF INVENTION

Technical Problem

Moreover, as the MCS in 256 QAM mode, a method (method 1) in which as disclosed in NPL 3, 256 QAM is introduced by deleting a low MCS (more precisely, QPSK) from 64 QAM mode, a method (method 2) in which as disclosed in NPL 4, 256 QAM is introduced by downsampling from the MCS table for 64 QAM mode, more precisely, while leaving some of QPSK behind, and the like are studied. Nevertheless, in method 1 in which the low MCS is deleted and 256 QAM is introduced, when a channel state that is so good that 256 QAM can be transferred without any error is abruptly changed to a channel state that is so poor that without QPSK, an error occurs, there is a need to perform a change from 256 QAM mode to 64 QAM mode with the RRC and to perform the transmission with QPSK. However, because a transmission periodicity of the RRC is comparatively long, in a case where the abrupt change in the channel state occurs, the transfer with QPSK is difficult to perform. Because of this, the throughput is decreased. On the other hand, in the case of method 2 in which the downsampled MCS table is used, a degradation in throughput that is so large that the transfer is difficult to perform does not occur, but because tight control of the MCS as in the pre-sampling 64 QAM mode prior to the downsampling is difficult to perform, a decrease in throughput is brought about.

An object of the present invention, which is made in view of the problems described above, is to increase throughout without increasing the number of pieces of control information.

Solution to Problem

In order to deal with the problems described above, constitutions of a terminal and a base station according to the present invention are as follows.

(1) In order to deal with the problems described above, according to an aspect of the present invention, there is provided a transmission apparatus equipped with multiple CQI tables, including: a control information extraction unit that extracts information relating to control information that is notified from a base station apparatus; an RRC configuration unit that performs a configuration in which the information relating to the control information and one CQI table among the multiple CQI tables are associated with each other; and a CQI determination unit that configures one CQI table among the multiple CQI tables based on the control information and the configuration, and generates a CQI index.

(2) In order to deal with the problems described above, in the transmission apparatus according to the aspect of the present invention, the information relating to the control information is control information that is included in a PDCCH or an ePDCCH.

(3) In order to deal with the problems described above, the transmission apparatus according to the aspect of the present invention is a type of search space of the PDCCH or the ePDCCH.

(4) In order to deal with the problems described above, in the transmission apparatus according to the aspect of the present invention, the control information that is included in the PDCCH or the ePDCCH is a CSI request field.

(5) In order to deal with the problems described above, according to another aspect of the present invention, there is provided a base station apparatus equipped with a control information generation unit that generates control information that is notified to a terminal apparatus, the base station apparatus including: an RRC information generation unit that generates a configuration in which one MCS table among multiple MCS tables and the control information are associated with each other; and an MCS determination unit that configures an MCS index based on the control information and the configuration that is generated by the RRC information generation unit.

(6) In order to deal with the problems described above, in the base station apparatus according to the aspect of the present invention, the information relating to the control information is control information that is included in a PDCCH or an ePDCCH.

(7) In order to deal with the problems described above, in the base station apparatus according to the aspect of the present invention, the control information that is included in the PDCCH or the ePDCCH is a CSI request field.

(8) In order to deal with the problems described above, in the base station apparatus according to the aspect of the present invention, the RRC information generation unit is made to be able to be configured for every CC.

Advantageous Effects of Invention

According to the present invention, an increase in the number of pieces of control information is suppressed, and thus a decrease in a downlink data rate can be suppressed.

BRIEF DESCRIPTION OF DRAWINGS

FIG. 3 is a CQI table for a 64 QAM mode according to the first embodiment.

FIG. 4 is a CQI table for a 256 QAM mode according to the first embodiment.

FIG. 5 is an MCS table for 64 QAM mode according to the first embodiment.

FIG. 6 is an MCS table for 256 QAM mode according to the first embodiment.

FIG. 8 is a table for describing a value of a CSI request field and operation thereof according to the first embodiment.

FIG. 9 is a table illustrating a modulation mode with the value of the CSI request field and a cell set according to the first embodiment.

FIG. 10 is a table illustrating another example of the modulation mode with the value of the CSI request field and the cell set according to the first embodiment.

FIG. 13 is one example of an arrangement of a USS and a CSS according to a second embodiment and the sequence chart of the modulation mode change according to the first embodiment.

FIG. 14 is one example of a CQI table for a 256 QAM mode according to a third embodiment.

DESCRIPTION OF EMBODIMENTS

Figure 1:
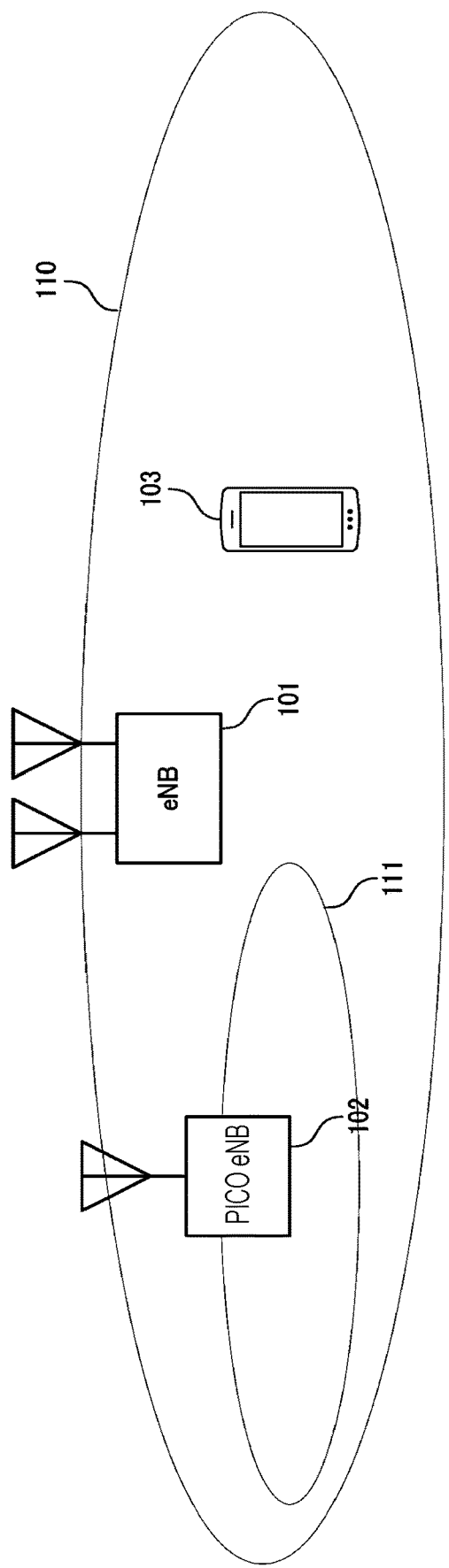
FIG. 1 is a diagram illustrating one example of a communication system according to a first embodiment.

Embodiments of the present invention will be described in detail below referring to the drawings. Channel State Information (CSI) that will be described below is constituted from a Rank Indicator (RI) that is a rank which the UE expects from an eNB for downlink transfer, a Precoding Matrix Indicator (PMI) indicating an index of a suitable precoding matrix in the rank, and a Channel Quality Indicator (CQI) indicating quality of each codeword.

First Embodiment

A first embodiment of the present invention will be described below referring to the drawings. FIG. 1 illustrates one example of a constitution of the wireless communication system according to the present embodiment. The system is constituted from a macro base station apparatus 101, a pico base station apparatus 102, and a terminal apparatus 103. An area 110 that is covered by the macro base station apparatus 101 and an area 111 that is covered by the pico base station apparatus 102 are present, and, according to a prescribed condition, the terminal apparatus makes a connection between the macro base station apparatus 101 and the pico base station apparatus 102. The number of antenna ports of the apparatus may be 1 or greater. The number of antenna ports here is not the number of physical antennas, and indicates the number of logical antennas that can be recognized by the apparatus that performs communication. Furthermore, the pico base station apparatus may not be the base station apparatus, and may be an apparatus that is referred to as a cluster head in a case where two terminal apparatuses perform direct communication with each other.

Figure 2:
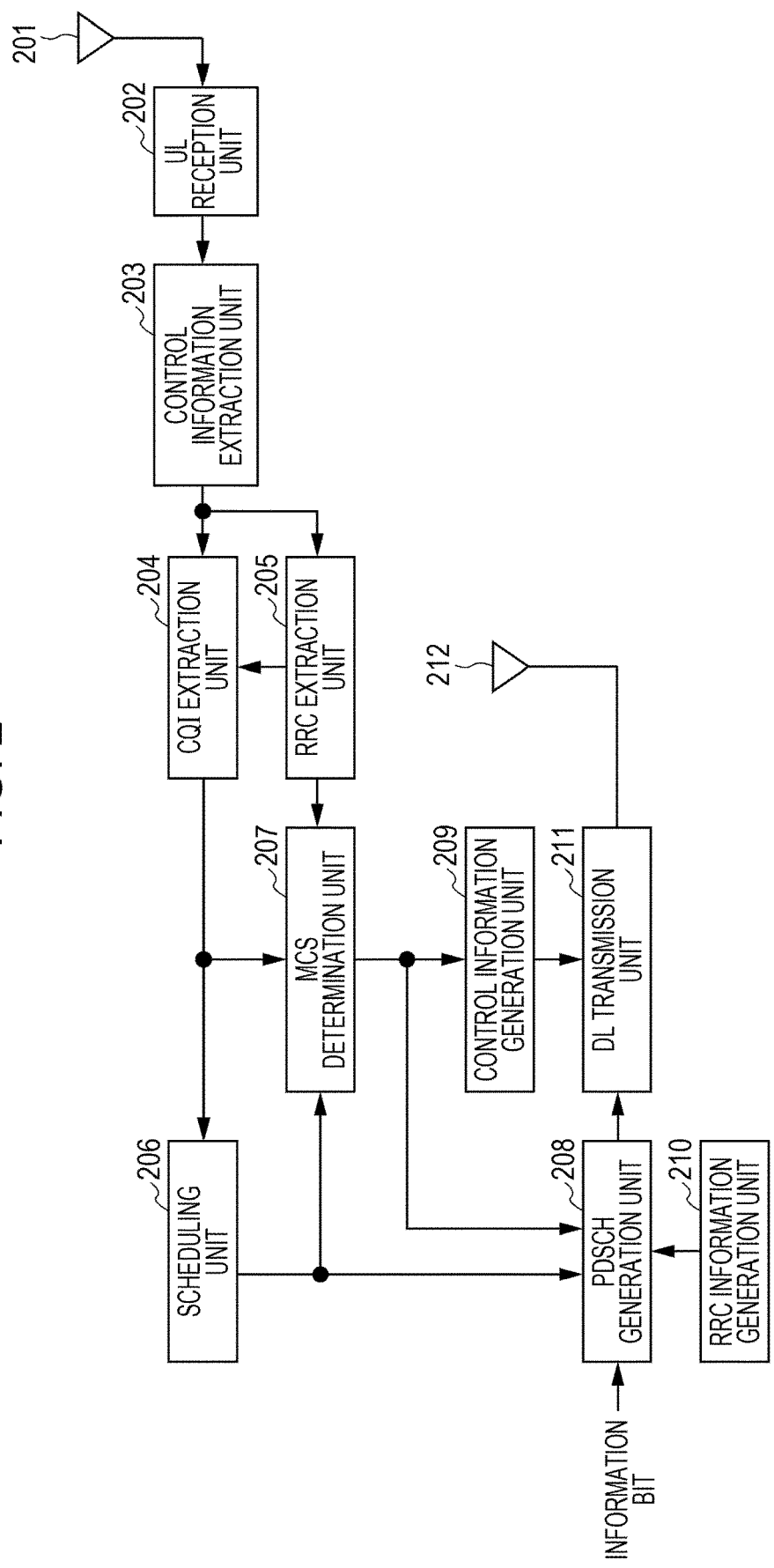
FIG. 2 is one example of a configuration of a base station apparatus according to the first embodiment.

FIG. 2 illustrates one example of a constitution of the macro base station apparatus 101. The constitution of the pico base station apparatus 102 may be the same as illustrated in FIG. 2. Moreover, FIG. 2 illustrates only a block that is indispensable to describe the present invention. A signal that is transmitted by the terminal apparatus 103 is received in a UL reception unit 202 through a receive antenna 201. Moreover, existing technologies, such as receive diversity and an adaptive array antenna, are also made to be applied to multiple receive antennas 201 that are present, and thus reception quality may be improved. The UL reception unit 202 performs processing, such as down-conversion or Fourier transform. An output of the UL reception unit 202 is input into a control information extraction unit 203. In the control information extraction unit 203, control information that is transmitted by the terminal apparatus is extracted. The control information here may be included in a Physical Uplink Control CHannel (PUCCH) that is a channel dedicated to the control information, and may be control information that is transmitted using a Physical Uplink Shared CHannel (PUSCH) that is a channel for transmission of information data. The control information that is extracted in the control information extraction unit 203 is input into a CQI extraction unit 204 and an RRC extraction unit 205. In the RRC extraction unit 205, information relating to RRC is extracted from the control information, and the extracted information is configured for each unit within the eNB. It is possible to perform various configurations. However, configurations that are directly associated with the present embodiment are a configuration (which is referred to as a modulation mode configuration according to the present embodiment) for determining which of a 64 QAM mode in which CQI and MCS tables in the related art are used and a 256 QAM mode in which a table that enables 256 QAM to be available, and a configuration (which is referred to as a CSI request configuration according to the present embodiment) for determining with which CC the eNB notifies the UE of the CSI when making a request for aperiodic CSI.

Moreover, according to the present embodiment, 64 QAM mode indicates a configuration in which the MCS table, the CQI table, and the like that are defined in Releases up to and including LTE Rel-11 are used, and indicates a configuration (constitution) in which 256 QAM is not included as a modulation scheme in which the MCS table that is applied to a PDSCH is constituted, a configuration (constitution) in which the modulation scheme in which the MCS table that is applied to a PDSCH is constituted is constituted from QPSK, 16 QAM, and 64 QAM, a configuration (constitution) in which 256 QAM is not included as the modulation scheme in which the CQI table that is used for feedback is constituted, a configuration (constitution) in which the modulation scheme in which the CQI table that is used for the feedback is constituted is constituted from QPSK, 16 QAM, and 64 QAM, or the like. On the other hand, according to the present embodiment, unlike in Releases up to and including LTE Rel-11, 256 QAM mode indicates a configuration in which the MCS table, the CQI table, and the like which assume that data transfer on the PDSCH in 256 QAM is performed are used, and indicates a configuration (constitution) in which at least 256 QAM is included as the modulation scheme in which the MCS table that is applied to the PDSCH is constituted, a configuration (constitution) in which the modulation scheme in which the MCS table that is applied to the PDSCH is constituted is constituted from QPSK, 16 QAM, 64 QAM, and 256 QAM, a configuration (constitution) in which 256 QAM is included as the modulation scheme in which the CQI table that is used for the feedback is constituted, a configuration (constitution) in which the modulation scheme in which the CQI table that is used for the feedback is constituted is constituted from QPSK, 16 QAM, 64 QAM, and 256 QAM, or the like. Switching between 64 QAM mode and 256 QAM mode is performed by a prescribed parameter that is given from a higher layer.

In the CQI extraction unit 204, a CQI index that is transmitted by each UE is extracted from the control information that is input from the control information extraction unit 203. The CQI here is information on downlink channel quality that is measured by the UE using the reference signal that is transmitted on the downlink. However, although the same CQI index is notified, interpretation in the eNB differs depending on which modulation mode of 64 QAM mode and 256 QAM mode the eNB configures. Which modulation mode is configured is determined by the RRC extraction unit 205 notifying the CQI extraction unit 204 that the UE has completed change configuration of the modulation mode. For example, in a case where, with the modulation mode configuration that is notified with the RRC, 64 QAM mode is configured in the eNB and the UE, with the CQI table as is illustrated in FIG. 3, the CQI index is interpreted as being notified by the UE. On the other hand, in a case where, with the modulation mode configuration that is notified with the RRC, 256 QAM mode is configured in the eNB and the UE, with the CQI table as is illustrated in FIG. 4, the CQI index is interpreted as being notified by the UE. At this point, the CQI table in FIG. 4 is one that results from decreasing the number of indexes for QPSK transfer in the table and replacing a CQI having high frequency efficiency, among CQIs for 64 QAM, with a CQI for 256 QAM in the table in FIG. 3. Moreover, FIG. 4 is one example. Any table that does not assume transfer in QPSK, or any CQI table that results from deleting the CQIs at equal intervals in the table in FIG. 3, is different from the CQI table in FIG. 3 as is the case with the modulation scheme, such as 256 QAM, and assumes transfer in 256 QAM may be available.

The CQI of each UE that is extracted in the CQI extraction unit 204 is input into a scheduling unit 206 and an MCS determination unit 207. In the scheduling unit 206, resource allocation to each UE is performed using the CQI of each UE. At this point, in a case where Multiple Input Multiple Output (MIMO) transfer is performed for the downlink, the scheduling is performed using the Rank Indicator (RI) or the Precoding Matrix Indicator (PMI) that is notified from the UE in addition to the CQI. Allocation information of each UE, which is output by the scheduling unit 206, is input into the MCS determination unit 207 and a PDSCH generation unit 208.

In the MCS determination unit 207, channel quality of a resource that is used for next-time transfer is estimated using resource allocation information that is input from the scheduling unit 206, the CQI index that is input from the CQI extraction unit 204, and the modulation mode that is input from the RRC extraction unit 205. Based on the estimated channel quality, an MCS of which a prescribed error rate is obtained is determined, and an MCS index is created. At this time, the created MCS index differs according to a modulation mode. For example, in a case where, with the modulation mode configuration that is notified with the RRC, 64 QAM mode is configured, the MCS index is selected from the MCS table as illustrated in FIG. 5. On the other hand, in a case where, with the modulation mode configuration that is notified with the RRC, 256 QAM mode is configured, the MCS index is selected from the MCS table as illustrated in FIG. 6. At this point, any MCS table in FIG. 6 that supports the modulation schemes up to and including 256 QAM may be available. The MCS index that is determined by the MCS determination unit 207 is input not only into the PDSCH generation unit 208, but also into a control information generation unit 209. In the control information generation unit 209, the MCS index that is input is mapped, as a format that is referred to as a DCI format, in the PDCCH, along with different control information such as allocation information. Moreover, in a case where the control information (the DCI format) is transmitted, PDCCH need not be used necessarily, a region for the control information may be secured in the PDSCH, and transmission may be performed using the PDSCH.

In the PDSCH generation unit 208, with the MCS index of each UE, which is input from the MCS determination unit 207, coding and modulation are performed on an information bit that is destined for each UE, and a signal that is destined for each UE is mapped to the PDSCH according to the allocation information that is input from the scheduling unit 206. The mapped signal is input into a DL transmission unit 211. Furthermore, in a case where information that the RRC information generation unit 210 has to notify the UE of is present, the RRC information is input into the PDSCH generation unit 208 and is transmitted, as a data signal that is destined for the UE, on the PDSCH. The RRC information is information that is notified with RRC signaling, and includes the modulation mode configuration that is configuration information on each of the modulation modes (256 QAM mode and 64 QAM mode), a CSI request configuration that is a constitution of a cell set that corresponds to a value of a CSI request field, or the like.

In the DL transmission unit 211, signals that are input from the PDSCH generation unit 208 and a PDCCH generation unit 211 are multiplexed, and then IFFT processing, band-limiting filtering processing, up-conversion, and the like are performed on a result of multiplexing. A signal that is output by the DL transmission unit 211 is transmitted to the terminal apparatus 103 through a transmit antenna 212.

Figure 7:
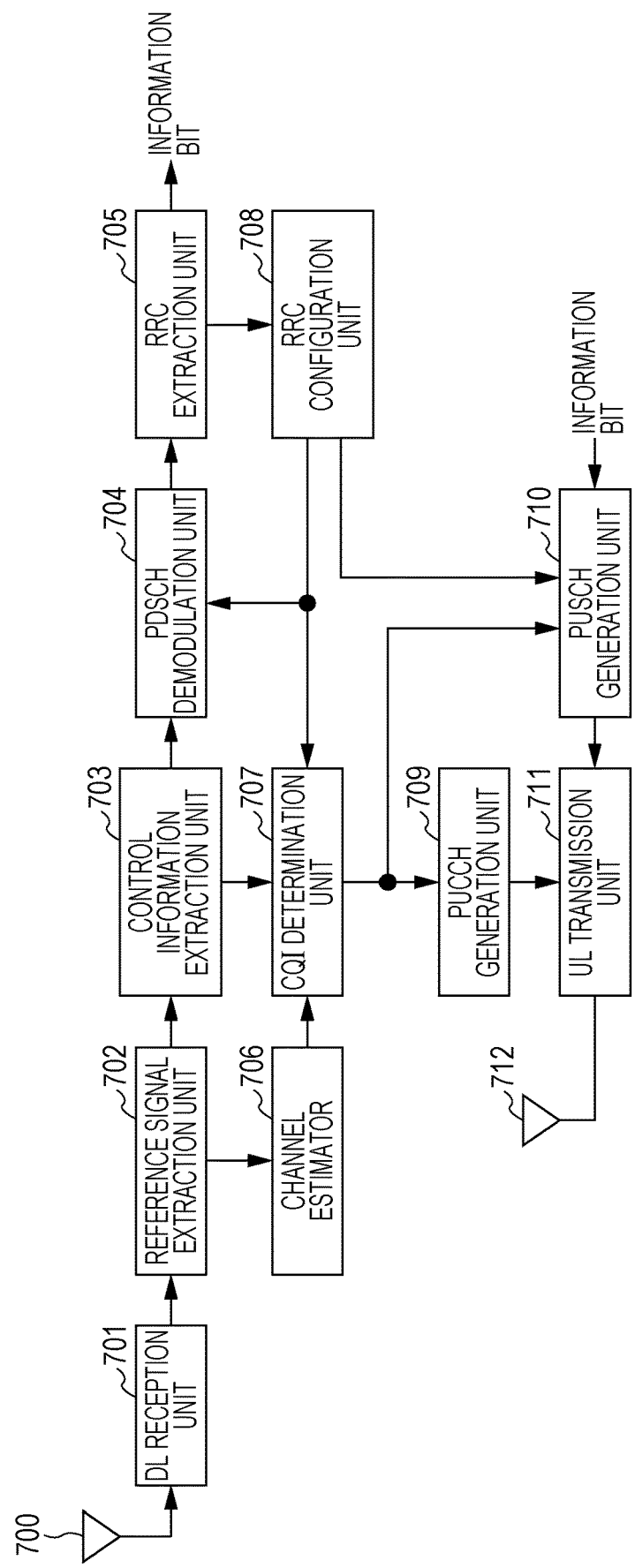
FIG. 7 is one example of a constitution of a terminal apparatus according to the first embodiment.

A signal that is transmitted by the macro base station apparatus 101 is received in the terminal apparatus 103 through a channel. FIG. 7 illustrates an example of a constitution of the terminal apparatus 103. A signal that is received in a receive antenna 700 is input into a DL reception unit 701, types of processing, such as the down-conversion, the band-limiting filtering, and discrete Fourier transform are performed on the signal that is input, and the obtained signal is input into a reference signal extraction unit 702. In the reference signal extraction unit 702, resources on which reference signals, such as a CRS, a CSI-RS, and a DMRS, that are transmitted by the eNB are transmitted are extracted, and the extracted resources are input into a channel estimator 706. In the channel estimator 706, a channel state between the eNB and the UE is estimated using the received reference signal that is input. A channel estimate that is obtained is input into a CQI determination unit 707. Moreover, although not illustrated in FIG. 7, some of the channel estimates that are obtained are also input in a PDSCH demodulation unit 704 for the purpose of being demodulated.

In the reference signal extraction unit 702, a resource element other than the reference signal is input into a control information extraction unit 703. In the control information extraction unit 703, information relating to the control information (the DCI format) is extracted from the received signal. Among the extracted pieces of control information, information relating to the MCS index of the PDSCH is input into the PDSCH demodulation unit 704. Furthermore, a feature according to the present invention is that control information relating to the aperiodic CSI, which is extracted, is input into the CQI determination unit 707, and that the control information relating to the aperiodic CSI is used in the CQI determination unit 707, and a description thereof will be provided below.

An output of the control information extraction unit 703 is input into the PDSCH demodulation unit 704. In the PDSCH demodulation unit 704, based on MCS information that is input from the control information extraction unit 703, demodulation of the PDSCH is performed. At this time, the MCS table that is referred to is selected based on the modulation mode configuration that is input from the RRC configuration unit 708, the MCS is determined from the selected MCS table and the notified MCS index, and the result is used for demodulation. For example, in the RRC configuration unit 708, in a case where 64 QAM mode is configured, determination of the MCS is performed based on the MCS table in FIG. 5, and in a case where 256 QAM mode is configured, the determination of the MCS is performed based on the MCS table in FIG. 6.

An output of the PDSCH demodulation unit 704 is input into an RRC extraction unit 708. In the RRC extraction unit 708, in a case where the RRC is included in the signal that is input, the RRC is extracted, and a result of the extraction is input into the RRC configuration unit 708. In the RRC configuration unit 708, processing that configures the control information that is transferred by the eNB with the RRC, for each unit of the UE, is performed. For example, in a case where the modulation mode configuration is notified with the RRC signaling and where 256 QAM mode is configured, in the PDSCH demodulation unit 704, the demodulation in 256 QAM mode is performed from the next-time or later transfer. Furthermore, the modulation mode configuration indicating whether the modulation mode is 64 QAM mode or 256 QAM mode is also input into a CQI configuration unit 707. As with the MCS configuration, in the case of 64 QAM mode, the CQI index is determined using the CQI table in FIG. 3, and in the case of 256 QAM mode, the CQI index is determined using the CQI table in FIG. 4.

Furthermore, in the RRC configuration unit 708, a result of configuring control with the RRC in each block within the UE is input into a PUSCH generation unit 710. The information that configuration of the RRC is completed is transmitted on the PUSCH to the eNB along with the information bit, and thus the eNB knows that the notified RRC information is configured in the UE.

In the CQI determination unit 707, the CQI is determined using the channel estimate that is input from the channel estimator 706 and the modulation mode configuration (the configuration indicating whether the modulation mode is 64 QAM mode or 256 QAM mode) that is input from the RRC configuration unit 708. Specifically, in the case of 64 QAM mode, the channel estimate is quantized with the CQI table in FIG. 4, and the CQI index that is a prescribed error rate is input into a PUCCH generation unit 710. Moreover, the notification of the CQI to the eNB may be performed on the PUCCH and may be performed on the PUSCH. In LTE, there are two types of notification of the CSI. One is notification of periodic CSI and the other is notification of the aperiodic CSI. While the notification of the periodic CSI is performed using the PUCCH, the notification of the aperiodic CSI is performed using the PUSCH. More precisely, as described above, the CQI index may be input into the PUSCH generation unit 710 without being input into a PUCCH generation unit 709.

Next, the feature of the present invention will be described in detail below. In a case where, as disclosed in the related art, the switching between the modulation modes is made to be performed with the modulation mode configuration that is notified with the RRC, the configuration with the RRC is transmitted from the eNB to the UE, the UE notifies the eNB that the configuration of the RRC which is notified is performed, and thus it is possible to change the modulation mode. However, it takes time to perform exchanging of the RRC. On the other hand, if control information relating to the modulation mode on the PDCCH or the like can be exchanged without using the RRC, because the modulation mode can be changed at high speed, although there is a case where the channel state abruptly changes, a suitable modulation mode can be selected. However, when an information bit indicating the selection of the modulation mode is attached to the PDCCH, the DCI format has to be newly defined, and furthermore, an amount of downlink control information is increased. Because of this, a decrease in effective throughput of data is caused.

Accordingly, according to the present embodiment, a method is described in which the modulation mode is changed at high speed without increasing the number of bits of the PDCCH.

In the LTE system, in a communication method that is referred to as a DCI format 0 or a DCI format 4 that is transmitted on the PDCCH, a two-bit field can be secured in order for the eNB to make a request to the UE for the Aperiodic CSI (A-CSI). This field is hereinafter referred to as the CSI request field. Information as illustrated in FIG. 8 can be transmitted with the two bits. As illustrated in FIG. 8, in a case where two bits are "10" and in a case where two bits are "11", an operation is performed that is given from the higher layer, but this is introduced in the specification in the current LTE system. At this point, it is possible to change configuration with the higher layer using the RRC signaling (CSI request configuration) that is described above. Therefore, configuration of the aperiodic CSI can be changed according to an environment, by changing the value of the CSI request field in the DCI format. However, because a field that is able to be designated with the CSI request field is only two patterns in the case of "10" and in the case of "11", the CSI request configurations that are the two patterns are made to be able to be changed to various configurations with the RRC signaling. In this manner, a specification is provided in which a high-speed change in a communication environment can be coped with, using a small amount of control information by combining a signal for which multiple configurations can be changed at high speed, and a signal for which a configuration itself of a certain thing can be changed at low speed.

According to the present embodiment, information on the modulation mode is added to the CSI request configuration that is configured with the RRC signaling. The reason for this is that the UE performs communication using multiple component carriers (CCs) (serving cells) for LTE, which are referred to as multiple cells, but that the multiple CCs which can be used by the UE are not limited to belonging to the same eNB and are constituted by multiple different eNBs. For example, it is assumed that the macro base station constitutes CC #1 and CC #2 and the pico eNB constitutes CC #3. In most cases, 256 QAM here is expected to be applied in the pico eNBs that are at a shorter distance from the UE than the macro eNBs because the pico eNBs are arranged to be more closely spaced than the macro eNBs. More precisely, normally, 256 QAM mode is applied in the pico eNB and 64 QAM mode is applied in the macro eNB. Therefore, in the case of "10" as illustrated in FIG. 9, with regard to CC #1, the CQI is calculated in 64 QAM mode and the notification of the CQI to the eNB on the PUSCH is performed. Furthermore, with regard to CC #3, the CQI is calculated in 256 QAM mode and the notification of the CQI to the eNB on the PUSCH is performed. However, in a case where, even in the CC that is constituted by the pico eNB, a blocking object suddenly appears between the UE and the eNB, because an SINR for reception in the UE is abruptly degraded, it is desirable that 64 QAM mode, not 256 QAM mode, is applied. However, it takes time to change the configuration with the RRC signaling. Accordingly, in the case of "11", it is assumed that the CQI is calculated in 64 QAM mode in CC #3. Although this configuration degrades the SINR abruptly and this brings about a situation where the communication is not performed in 256 QAM mode, a change to 64 QAM mode can be made at high speed by the DCI format that is notified on the PDCCH.

Moreover, in CC #3 that, as illustrated in FIG. 9, is constituted by the pico eNB, the modulation mode may be configured in such a manner that the mode is fixed in every CC as illustrated in FIG. 10, without the need to necessarily prepare 256 QAM mode and 64 QAM mode. In this case, the modulation mode of CC #3 needs to be changed to 64 QAM mode in transmitting the CQI in CC #2 in FIG. 9, but the CSI request configuration is changed with the RRC signaling. Thus, an operation in the CSI request field is configured as illustrated in FIG. 10. Because of this, the CQI table that is referred to when the UE calculates the CQI index that is notified to the eNB can be configured with a two-bit value of the CSI request field in the DCI format that is notified on the PDCCH (or an ePDCCH). As a result, the CQI can be transmitted in CC #2 while the modulation mode in CC #3 is maintained as 256 QAM, without configuring the CQI table that has to be referred to, by changing the modulation mode configuration with the RRC signaling.

The configuration of the modulation mode is described above as being able to be performed in every CC in a case where multiple CCs are present. Incidentally, in LTE Rel-11, it is possible for multiple eNBs to cooperate with one another to communicate with the UE, and a transfer mode is stipulated for performing coordinated communication. In order to perform the coordinated communication, it is preferable that the UE notifies multiple eNBs of the CSI, and a mechanism that is referred to as multiple CSI processes is introduced in the specification. In the multiple CSI processes, each UE can perform multiple CSI reports in each CC. Accordingly, with regard to the multiple CSI report processes (which is hereinafter referred to as a CSI process) within one CC, each of the modulation modes is individually configured, and thus the modulation mode can be changed at every transmission point (eNB) in the coordinated communication, such as dynamic switching between transmission stations. More precisely, different CQI tables can be configured, with the RRC signaling, for each CSI process, and the CQI index based on the CQI table that is configured (constituted) with the RRC signaling can be reported for every CSI process.

Figure 11:
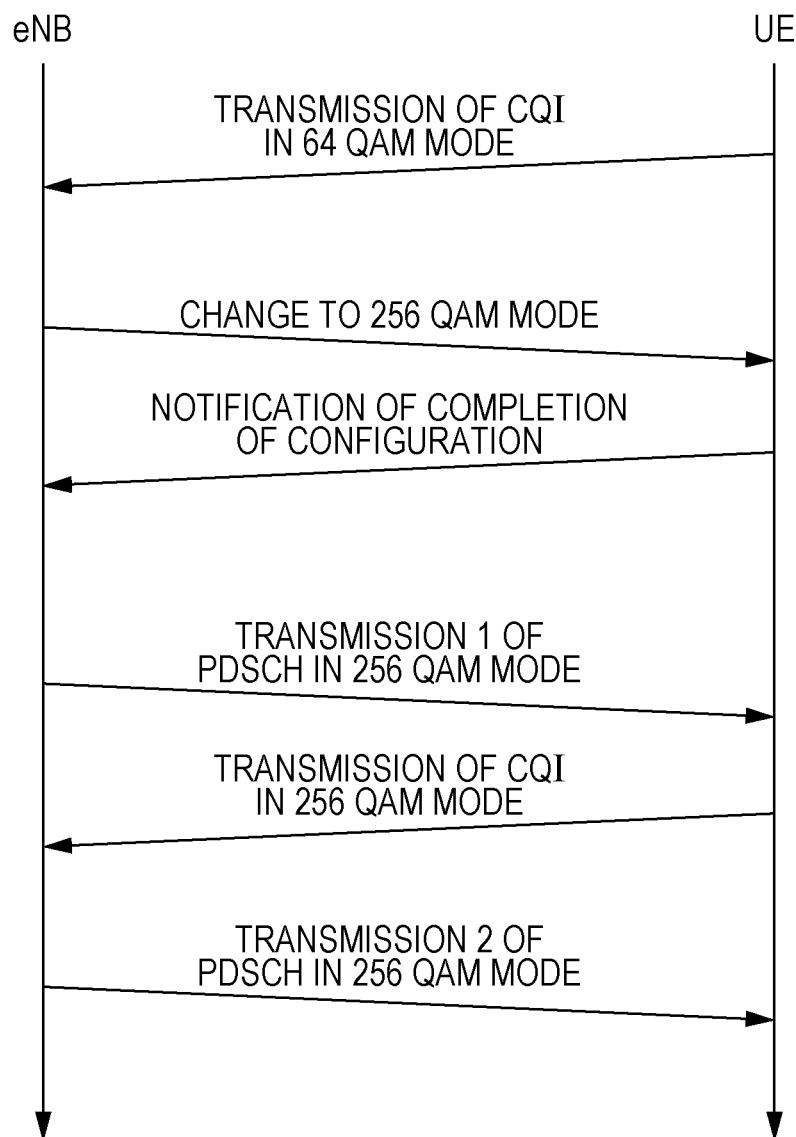
FIG. 11 is one example of a sequence chart of a modulation mode change in the related art.

Next, a different effect of the present embodiment is described. A case where the present invention is not used is first described referring to a sequence chart in FIG. 11. An example in which the modulation mode is changed with the RRC is described. First, the UE notifies the eNB of the CQI in 64 QAM mode. With the received CQI, the eNB determines that the SINR for reception in the UE is sufficiently high, and notifies the UE that configuration for 256 QAM mode is performed, with the RRC. The UE that receives the RRC notifies the eNB that the configuration of 256 QAM mode is completed. Thereafter, the eNB performs transfer in 256 QAM mode. At this point, because the UE notifies the eNB of the CQI only in 64 QAM, there is a low likelihood that the eNB will be able to select a suitable MCS. After the transfer of the PDSCH, when transmitting the CQI, the UE performs the notification of the CQI in 256 QAM mode, and in the next transmission on the PDSCH, 256 QAM mode operates in the suitable MCS. With a change of the modulation mode with the RRC in this manner, there is a high likelihood that the suitable MCS will not be selected in the initial transfer of the PDSCH after the change of the modulation mode. Next, the change of the modulation mode, in which the CSI request field within the PDCCH is used, and which is disclosed according the present embodiment, will be described below referring to a sequence chart in FIG. 12. The configuration of the modulation mode in every CC in the system is constituted in advance with an initial configuration or the RRC. As with the related art, the UE notifies the eNB of the CQI in 64 QAM mode in a certain CC. In a case where with the received CQI, the eNB determines that the configuration for 256 QAM may be better, the eNB makes a request to the UE for feedback on the CQI in 256 QAM mode in the CC, using the CSI request field within the PDCCH. At this time, on the PDCCH, the DCI format in which uplink data transfer, more precisely, resource allocation for the PUSCH is also notified is used. The UE that receives the PDCCH calculates the CQI in the CC, and then calculates the CQI index using the CQI table for 256 QAM mode and transmits the calculated CQI index on the PUSCH in a prescribed CC. The eNB that receives the PUSCH selects a suitable MCS using the CQI in the notified 256 QAM mode, and performs the transfer of the PDSCH in 256 QAM mode. In this manner, in some cases, with the change of the modulation mode with the RRC, there is no CQI after the mode is changed and the suitable MCS is difficult to select, but in a case where the CSI request field within the PDCCH is used, because a request can be made to the UE for the notification of the CSI request field in the DCI format, along with the notification of the modulation mode configuration with the RRC signaling, the PDSCH transfer with the suitable MCS is possible after the mode is changed. Moreover, as illustrated in FIG. 10, with the constitution (configuration) of the CSI request configuration, a request can be made for the feedback on the CQI in the modulation mode that varies with every CC can be requested.

Figure 12:
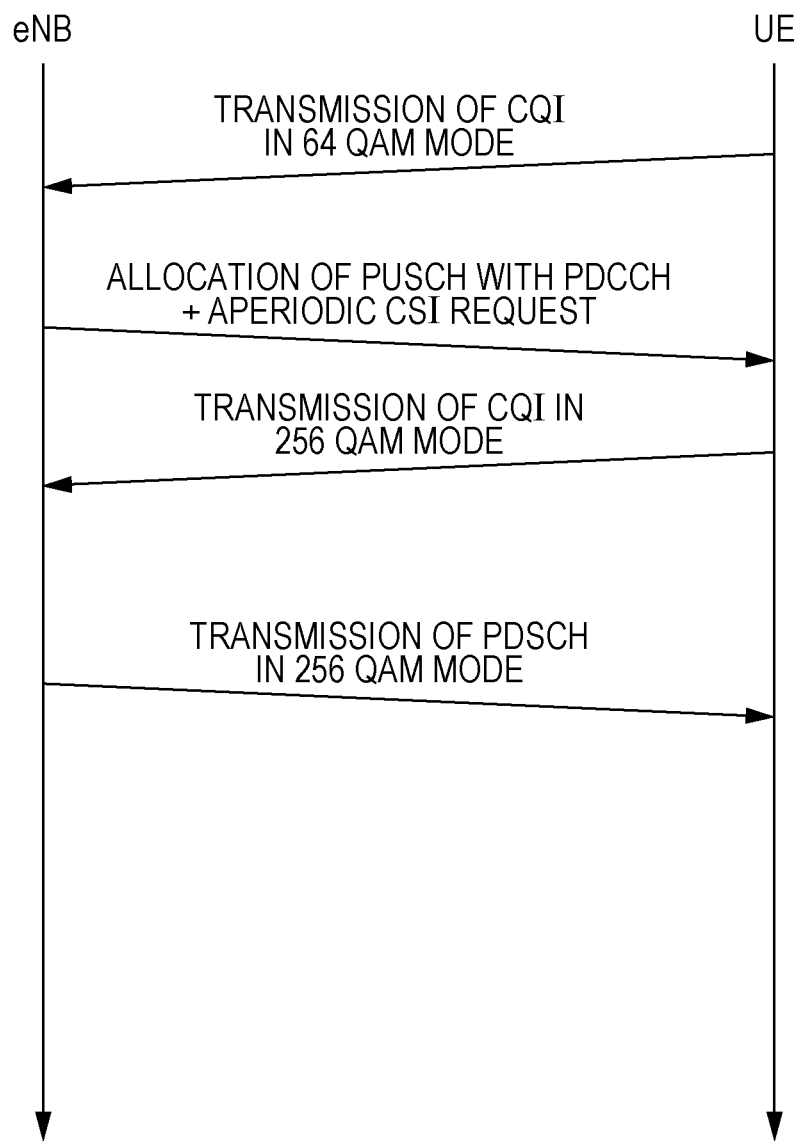
FIG. 12 is one example of a sequence chart of a modulation mode change according to the first embodiment.

According to the present embodiment, an example is described in which the configuration of the modulation mode is performed, with the CSI request configuration, for every CC, but the configuration of the modulation mode may be performed while being associated with the value of the CSI request field. For example, in the case of "10", 64 QAM mode may be assumed, and in the case of "11", 256 QAM mode may be assumed. Furthermore, FIG. 12 illustrates an example in which, in a case where a request for transmission of the CSI is detected in the CC for which 256 QAM mode is configured, the UE notifies the CQI in 256 QAM mode and then receives the PDSCH that is transmitted in 256 QAM mode, from the eNB. As another example, in a case where the UE receives the modulation mode for every CC with the RRC and then the eNB transmits the PDSCH before a request is made for the transmission of the A-CSI in 256 QAM mode, the transmission may be performed in 64 QAM mode. More precisely, with the transmission of the A-CSI in 256 QAM mode, the switching between the modulation modes may be performed.

Furthermore, as described above, with the modulation mode configuration that is notified with the RRC, the MCS determination unit 207 can determine the MCS table that is referred to, but moreover, with a method different from this, the MCS determination unit 207 can select the MCS table that is referred to. With the RRC scheduling, the eNB notifies the UE of the CSI request configuration, and is notified by the UE that the CSI request configuration is applied (constituted). For example, a case where the CSI request configuration is configured as illustrated in FIG. 9 is considered. At this point, when with the DCI format that is transmitted on the PDCCH, "10" is notified as the CSI request field, the selection of the MCS table with 64 QAM mode in CC #1 and 256 QAM mode in CC #3 can be performed with the DCI format without depending on the modulation mode configuration with the RRC. In this manner, the MCS determination unit 207 can generate the MCS index, with the RRC extraction unit 205 that extracts the information that the DCI format that is input from the control information generation unit 209, the CSI request configuration that is generated by an RRC generation unit 210, and the CSI request configuration are applied in the UE.

Second Embodiment

According to the first embodiment, the method is disclosed in which the modulation mode is changed at higher speed with the CSI request field that is included in the PDCCH than with the RRC. According to the present embodiment, a method is disclosed in which the modulation mode is changed at high speed using a method other than the method for the CSI request field.

In LTE, the PUCCH has a region that is referred to as a UE-specific Search Space (USS) and a region that is referred to as a Common Search Space (CSS), and the eNB can arrange the control information (the allocation information, the MCS, or the like) that is destined for the UE, in the USS and the CSS. The UE checks both of the USS and the CSS for the presence of absence of the control information that is destined for the UE itself.

Accordingly, whether the control information is information that is notified with the USS, or information that is notified with the CSS is checked. For example, associations of the USS and the CSS with the modulation modes, respectively, are as illustrated in FIG. 13. FIG. 13 is one example, a relationship between the USS and the CSS may be reversed. For example, in a case where the eNB wants to perform the transfer in 256 QAM mode, the eNB notifies the UE, for which the MCS index that is notified with the USS is configured as 256 QAM mode and the MCS index that is notified with the CSS is configured as 64 QAM mode, the eNB notifies, of the control information using the USS. Because the control information is included in the USS that is destined for the UE itself, the UE determines the MCS for the PDSCH, using the notified MCS index and the MCS table for 256 QAM mode. Furthermore, in a case where the channel state abruptly changes and the eNB determines that a higher throughput characteristic is obtained in 64 QAM mode than in 256 QAM mode, in order to perform a change to 64 QAM mode, the eNB performs the notification of the control information with the CSS.

At this point, when it is assumed that the USS needs to be used to notify 256 QAM at all times, because there is a concern that an unbalance between the size of the USS and the size of the CSS will occur, an association between the USS and the CSS may be configured (constituted) with the RRC signaling. Furthermore, in a case where the channel state is stationary, the change of the modulation mode is unnecessary, and in a case where the UE moves at high speed, a change of the modulation mode is indispensable. Accordingly, on the assumption that the change of the modulation mode is basically performed with the RRC, switching between reading pieces of control information with the USS and the CSS, which is described above, may be performed in a transient state that is maintained until the eNB notifies the configuration with the RRC and then the UE notifies the eNB that the configuration is completed. Moreover, in a case where multiple CCs are present, the change of the modulation mode may be performed only on the CC in which the PDCCH is transmitted, and the change of the modulation mode may be applied in all the CCs.

Moreover, in addition to the PDCCH in LTE Releases up to and including LTE Rel-10, a control channel that is referred to as an enhanced PDCCH (ePDCCH) is defined in LTE Rel-11. The control information can be notified on the ePDCCH, using one portion of a PDSCH region, not using a PDCCH region in the related art. Accordingly, as opposed to the modulation mode being changed depending on whether the DCI format is arranged in the USS or is arranged in the CSS, which is described above, the modulation mode may be changed based on whether the DCI format is arranged in the ePDCCH or is arranged in the PDCCH (the USS or the CSS) and the CQI index may be fed back to the eNB with the CQI table that corresponds to the changed modulation mode. Furthermore, the modulation mode may be changed depending on whether the DCI format is arranged in the CSS of the PDCCH or is arranged in the USS of the PDCCH or the ePDCCH, and at least one of the CQI table and the MCS table that are referred to may be selected.

In this manner, the UE changes the modulation mode depending on whether the control information is arranged in the USS of the PDCCH or is arranged in the CSS. By doing this, the modulation mode can be changed without depending on the RRC. As a result, because the modulation mode can be caused to accommodate the change of the channel state, the throughput can be increased.

Furthermore, processing that varies according to which of regions of the USS and the CSS of the PDCCH the DCI format is arranged in may be applied to the DCI format that is described according to the first embodiment. For example, in 64 QAM mode, in a case where the eNB makes a request to the UE for the CSI report, the control information generation unit 209 generates the PDCCH in such a manner that the DCI format which includes the CSI request field is arranged in the USS. The UE decodes the DCI format that is destined for the UE itself and that is arranged in the USS, with the control information extraction unit 703. At this point, as illustrated in FIG. 13, when an association between the arrangement of the DCI format and the modulation mode is made, in a case where the DCI format is arranged in the USS, the CQI determination unit 707 generates the CQI index that is notified to the eNB, using the CQI table (for example, FIG. 4) in 256 QAM mode. On the other hand, in a case where the eNB makes a request to the UE for the CQI for 64 QAM mode, the control information generation unit 209 arranges the DCI format that includes the CSI request field, in the CSS. In this manner, with the control information generation unit 209, the eNB can make a request to the UE for the CQI index in different modulation modes, depending on whether the DCI format is arranged in the USS, or is arranged in the CSS. Moreover, the switching between the modulation modes with the arrangement of the USS and the CSS is not limited to that described above. For example, in a case where the number of modulation modes is limited to 2, arrangement request can be made for the CQI index in different modulation modes by arranging the DCI forma in the USS in a case where a request is made for the CQI index that is different from that in the modulation mode that is configured with the RRC signaling, and by arranging the DCI format in the CSS in a case where a request is made for the CQI index in the same modulation mode.

Third Embodiment

According to a separate embodiment, in a case where the eNB makes a CSI request to the UE, with regard to the CQI index that is fed back to the eNB by the UE, which of multiple CQI tables the CQI table based on which the CQI index has to be generated is described.

The CSI request is made with a format that includes the resource allocation for the PUSCH, which is referred to as the DCI format 0 and the DCI format 4. The DCI format 0 is a format for transmitting the PUSCH with a single antenna, and the DCI format 4 is a format for transmitting the PUSCH with a multi-antenna. The eNB notifies the UE of the DCI format 0 and 4 on the PDCCH.

At this point, multi-antenna transmission can improve the SINR much more than single antenna transmission. More precisely, there is a high likelihood that the transfer with 256 QAM will be performed without an error. Accordingly, in a case where the eNB generates the DCI format 4 with the control information generation unit 209 and where the DCI format 4 is detected in the control information extraction unit 703 of the UE, when a request for transmission of the aperiodic CSI is configured in the CSI request field, the CQI index is generated based on the CQI table for 256 QAM mode in the CQI determination unit 707. The generated CQI index is input into the PUSCH generation unit 710, and is transmitted to the eNB through a UL transmission unit 711 and a transmit antenna 712. On the other hand, the single antenna transfer has a lower SINR than the multi-antenna transfer. More precisely, there is a high likelihood that an error will occur in 256 QAM. In a case where the eNB generates the DCI format 0 with the control information generation unit and where the DCI format 0 is detected in the control information extraction unit 703 of the UE, when the request for the transmission of the aperiodic CSI is configured in the CSI request field, the CQI index, as with the LTE system in the related art, is generated based on the CQI table for 64 QAM mode in the CQI determination unit 707. The generated CQI index is input into the PUSCH generation unit 710, and is transmitted to the eNB through the UL transmission unit 711 and the transmit antenna 712.

In this manner, the CQI that results from changing the CQI table that is referred to at higher speed than is the case with notification with the RRC can be fed back by configuring the CQI table that is referred to, based on a type of DCI format that the eNB notifies the UE of.

Moreover, it is possible to configure a two-bit CSI request field in the DCI format 4 and the DCI format 0. Accordingly, as with the first embodiment, the modulation mode for each CC and each CSI report may be changed by using a value that is able to be configured with the RRC, in the two-bit CSI request fields in the DCI format 0 and the DCI format 4.

Furthermore, the CQI table that is referred to is described as being changed with the region (which is the USS or the CSS) in which the DCI format is arranged, but the present embodiment is not limited to this. For example, a method in which the CQI table that is referred to is configured with a number of a subframe on which the DCI format is received, or a number of a subframe on which the CQI index is notified is also included in the present invention. Furthermore, no limitation to the number of the subframe is imposed, and the CQI table or the MCS table that is referred to may be configured with an uplink and downlink configuration in dynamic TDD.

Fourth Embodiment

In a case where the change of the modulation mode is performed with the RRC, it is possible not to perform communication on the PDSCH and the like until the UE notifies that the configuration with RRC is completed. However, because the RRC is transmitted on the PUSCH, the PDSCH is difficult to transmit as long as resource allocation for the uplink is not performed. Before the notification that the configuration is completed is received from the UE, it is possible to transmit the PDSCH in the pre-change modulation mode (or the post-change modulation mode). However, in a case where the UE changes the modulation mode (or in a case where the UE does not change the modulation mode), discordance occurs in the MCS table that has to be referred to during the transmission and reception, and data is difficult to correctly demodulate and/or decode. Accordingly, according to the present embodiment, a method is disclosed in which before the notification that the configuration with the RRC is completed is received from the UE, the transfer in the MCS is made possible after the change of the modulation mode.

The CQI table that is currently used in LTE is the one that is illustrated in FIG. 3, and the MCS table is the one that is illustrated in FIG. 5. A case where as with the first embodiment, a table that is illustrated, as the CQI table for 256 QAM mode, in FIG. 4 is used is considered. At this time, in the tables in FIGS. 3 and 4, the CQI indexes 0 and 1 indicate the same frequency efficiency. More precisely, in a case where the index is 0 or 1, although different modulation modes are selected between the eNB and the UE, the same channel quality is indicated. According to the present embodiment, the index in which the channel quality that is indicated by the index is the same in each modulation mode in this manner is intentionally is created.

FIG. 14 indicates the CQI index in 256 QAM mode according to the present embodiment. Indexes that are not surrounded by thick lines are indexes each of which is added in 256 QAM mode, and are indexes each of which demands the transfer in 256 QAM. The indexes that are surrounded by thick lines are indexes each of which demands the transfer in the same MCS as that in 64 QAM mode (FIG. 3). For example, a case where the eNB notifies the UE that the change to 256QAM mode is made and the configuration is performed in the UE, but where in order not to allocate the PUSCH, the eNB is not notified that the configuration of the RRC is completed is considered. At this time, with the periodic CSI or the like, the UE needs to notify the eNB of the CQI and 256 QAM mode is configured for the UE, but the eNB determines that the UE still remains in 64 QAM mode. In this case, it is determined that the notified CQI index is for different channel quality.

At this point, when it comes to the notification of the CQI before performing this notification that the configuration of the RRC is completed, the notification of the CQI is performed using CQI indexes (more precisely, 0, 1, 3, 5, 7 to 12) that are not surrounded by thick lines in the CSI table in FIG. 14. For example, in 256 QAM mode, even in a case where a request can be made for the transfer at a frequency efficiency of approximately 7, a request is made for a frequency efficiency of 3.9023 for the CQI index 12. By doing this, in the eNB, although the CQI table for 64 QAM mode is referred to, because a suitable MCS can be selected, the CQI table that is referred to can be caused to differ, thereby limiting a transfer rate.

The index and information in the CQI table are caused to be common to multiple tables as described above, and additionally are common to the MCS table in the same manner. Thus, the MCS table that is referred to can be caused to differ, thereby eliminating the transfer error. Moreover, in FIG. 6, 256 QAM modes are arranged in order of increasing a coding rate of 256 QAM, but no limitation to this is imposed. An arrangement in order of decreasing the coding rate of 256 QAM, an arrangement for minimizing a square error, or any other arrangement may be available. Furthermore, for indexes indicating different pieces of information with multiple tables, three 256 QAMs at equal intervals and three continuous QAMs are assumed in FIG. 14, but no limitation to this is imposed. Combinations of all or some of the embodiments described above are included in the present invention.

A program running on the base station and the terminal according to the present invention is a program (a program for causing a computer to operate) that controls a CPU and the like in such a manner as to realize the function according to the embodiments of the present invention, which are described above. Then, pieces of information that are handled in the apparatuses are temporarily accumulated in a RAM while being processed. Thereafter, the pieces of information are stored in various ROMs or HDDs, and when the need arises, is read by the CPU to be modified or written. Of a semiconductor medium (for example, a ROM, a nonvolatile memory card, or the like), an optical storage medium (for example, a DVD, an MO, an MD, a CD, a BD, or the like), a magnetic storage medium (for example, a magnetic tape, a flexible disk, or the like), and the like, any one may be possible as a recording medium on which to store the program. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where the programs are distributed on the market, the programs, each of which is stored on a portable recording medium, can be distributed, or can be transmitted to a server computer that is connected through a network such as the Internet. In this case, a storage device of the server computer is also included in the present invention. Furthermore, some and all of the portions of the base station and the terminal to the embodiments described above may be realized as an LSI that is a typical integrated circuit. Each functional block of the base station and the terminal may be individually built into a chip, and some or all functional blocks may be integrated into a chip. Furthermore, a circuit integration technique is not limited to the LSI, and an integrated circuit for the functional block may be realized as a dedicated circuit or a general-purpose processor. In a case where each functional block is integrated into a circuit, an integrated circuit control unit is added that controls these functional blocks.

Furthermore, a circuit integration technique is not limited to the LSI, and an integrated circuit for the functional block may be realized as a dedicated circuit or a general-purpose processor. Furthermore, if with advances in a semiconductor technology, a circuit integration technology with which an LSI is replaced appears, it is also possible to use an integrated circuit to which such a technology is applied.

Furthermore, the invention in the present application is not limited to the embodiments described above. Furthermore, application of the terminal according to the invention in the present application is not limited to a mobile station apparatus. It goes without saying that the terminal can be applied to a stationary-type electronic apparatus that is installed indoors or outdoors, or a non-movable-type electronic apparatus, for example, an AV apparatus, a kitchen apparatus, a cleaning or washing machine, an air-conditioning apparatus, office equipment, a vending machine, and other household apparatuses.

The embodiments of the invention are described in detail above referring to the drawings, but the specific constitution is not limited to the embodiments and also includes an amendment to a design and the like that fall within the scope that does not depart from the gist of the present invention. Furthermore, various modifications are possible within the scope of the present invention defined by claims, and embodiments that are made by suitably combining technical means that are disclosed according to the different embodiments are also included in the technical scope of the present invention. Furthermore, a configuration in which a constituent element that achieves the same effect is substituted for the one that is described according to each of the embodiments described above is also included in the technical scope of the present invention.

INDUSTRIAL APPLICABILITY

The present invention is suitable for use in a wireless base station, a wireless terminal, a wireless communication system, or a wireless communication method.

Moreover, the present international application claims the benefits of Japanese Patent Application No. 2013-270703 filed on Dec. 27, 2013, the entire contents of which are incorporated herein by reference.

REFERENCE SIGNS LIST

101 MACRO BASE STATION APPARATUS
102 PICO BASE STATION APPARATUS
103 TERMINAL APPARATUS
201 RECEIVE ANTENNA
202 UL RECEPTION UNIT
203 CONTROL INFORMATION EXTRACTION UNIT
204 CQI EXTRACTION UNIT
205 RRC EXTRACTION UNIT
206 SCHEDULING UNIT
207 MCS DETERMINATION UNIT
208 PDSCH GENERATION UNIT
209 CONTROL INFORMATION GENERATION UNIT
210 RRC GENERATION UNIT
211 DL TRANSMISSION UNIT
212 TRANSMIT ANTENNA
700 RECEIVE ANTENNA
701 DL RECEPTION UNIT
702 REFERENCE SIGNAL EXTRACTION UNIT
703 CONTROL INFORMATION EXTRACTION UNIT
704 PDSCH DEMODULATION UNIT
705 RRC EXTRACTION UNIT
706 CHANNEL ESTIMATOR
707 CQI DETERMINATION UNIT
708 RRC CONFIGURATION UNIT
709 PUCCH GENERATION UNIT
710 PUSCH GENERATION UNIT
711 UL TRANSMISSION UNIT
712 TRANSMIT ANTENNA

The invention claimed is:

1. A terminal apparatus comprising:
a DL reception unit that receives, from a base station apparatus, a Physical Downlink Shared Channel (PDSCH) and a Physical Downlink Control Channel (PDCCH),
the PDSCH includes Radio Resource Control (RRC) information that includes an indication of applicability of a second Channel Quality Indicator (CQI) table of a first CQI table and the second CQI table, and
a PDSCH demodulation unit that determines a modulation scheme which is used in the PDSCH demodulation, using at least either a first Modulation Coding Scheme (MCS) table or a second MCS table, wherein
the first MCS table is used to determine the modulation scheme if the indication is configured and the PDSCH is assigned by the PDCCH in common search space,
the first MCS table includes information relating to a first modulation scheme, the information relating to the first modulation scheme corresponds to QPSK, 16QAM, or 64QAM,
the second MCS table includes information relating to a second modulation scheme, the information relating to the second modulation scheme corresponds to QPSK, 16QAM, 64QAM, or 256QAM, the first CQI table includes information relating to a third modulation scheme, the information relating to the third modulation scheme includes QPSK, 16QAM, or 64QAM, the second CQI table includes information relating to a forth modulation scheme, and the information relating to the forth modulation scheme includes QPSK, 16QAM, 64QAM, and 256QAM.

2. The terminal apparatus according to claim 1, wherein the modulation scheme which is used in the PDSCH is based on the first MCS table, in a case where the indication is not configured.

3. A base station apparatus comprising:

a PDSCH generation unit that modulates a Physical Downlink Shared Channel (PDSCH), and a transmission unit that transmits, to a terminal apparatus, the PDSCH and a Physical Downlink Control Channel (PDCCH);

the PDSCH includes Radio Resource Control (RRC) information that includes an indication of applicability of a second Channel Quality Indicator (CQI) table of a first CQI table and the second CQI table;

a PDSCH modulation unit that determines a modulation scheme which is used in the PDSCH modulation, using at least either a first Modulation Coding Scheme (MCS) table or a second MCS table, wherein the first MCS table is used to determine the modulation scheme if the indication is configured and the PDSCH is assigned by the PDCCH in common search space, the first MCS table includes information relating to a first modulation scheme, the information relating to the first modulation scheme corresponds to QPSK, 16 QAM, or 64 QAM, the second MCS table includes information relating to a second modulation scheme, the information relating to the second modulation scheme corresponds to QPSK, 16 QAM, 64 QAM, or 256 QAM, the first CQI table includes information relating to a third modulation scheme, the information relating to the third modulation scheme includes QPSK, 16QAM, or 64QAM, the second CQI table includes information relating to a forth modulation scheme, and the information relating to the forth modulation scheme includes QPSK, 16QAM, 64QAM, and 256QAM.

4. The base station apparatus according to claim 3, wherein the modulation scheme which is used in the PDSCH is based on the first MCS table, in a case where the indication is not configured.

* * * * *